(12) United States Patent
Marocco

(10) Patent No.: US 6,962,146 B2
(45) Date of Patent: Nov. 8, 2005

(54) PROCESS FOR MANUFACTURING COMPOSITES AND FOR STRUCTURALLY REPAIRING AND AESTHETICALLY FILLING SLABS OF STONE MATERIALS

(75) Inventor: Giuseppe Marocco, Turin (IT)

(73) Assignee: Geo S.r.l., Settimo Torinese (IT)

(*) Notice: Subject to any disclaimer, the term of this patent is extended or adjusted under 35 U.S.C. 154(b) by 0 days.

(21) Appl. No.: 10/466,325

(22) PCT Filed: Jan. 17, 2002

(86) PCT No.: PCT/EP02/00424

§ 371 (c)(1),
(2), (4) Date: Jul. 30, 2003

(87) PCT Pub. No.: WO02/060836

PCT Pub. Date: Aug. 8, 2002

(65) Prior Publication Data

US 2004/0076771 A1    Apr. 22, 2004

(30) Foreign Application Priority Data

Jan. 31, 2001  (EP) ................................. 01830064

(51) Int. Cl.[7] .............................................. B28D 1/02
(52) U.S. Cl. ................ 125/12; 125/16.01; 125/17; 125/23.01; 125/35; 264/102; 264/261
(58) Field of Search .................... 125/12.17, 16.01, 125/23.01, 35; 264/102, 261, 271.1, 279.1

(56) References Cited

U.S. PATENT DOCUMENTS

| | | | | | |
|---|---|---|---|---|---|
| 3,265,056 | A | * | 8/1966 | Pieper et al. ............ | 125/16.01 |
| 4,013,809 | A | * | 3/1977 | Marocco ..................... | 427/296 |
| 4,092,393 | A | * | 5/1978 | Marocco ..................... | 264/102 |
| 4,177,789 | A | * | 12/1979 | Marocco ........................ | 125/1 |
| 4,350,552 | A | * | 9/1982 | Bourke ........................ | 156/254 |
| 4,534,924 | A | * | 8/1985 | Kariakin ..................... | 264/259 |
| 5,226,402 | A | | 7/1993 | Marocco | |

FOREIGN PATENT DOCUMENTS

| | | |
|---|---|---|
| DE | 196 13 439 | 11/1996 |
| EP | 0 344 619 | 12/1989 |

\* cited by examiner

*Primary Examiner*—Lee D. Wilson
*Assistant Examiner*—Anthony Ojini
(74) *Attorney, Agent, or Firm*—Oblon, Spivak, McClelland, Maier & Neustadt, P.C.

(57) ABSTRACT

A process id disclosed for structurally repairing and aesthetically filling, and mutually coupling slabs (1) and layers (2–4) into a block (5), comprising the steps of: heating, drying and impregnating the slabs (1) with resin; penetrating the resin through atmospheric pressure; inserting positive pressures; applying a liquid- or gas-tight sealing coating (6, 7, 8) around the block (5) to allow resin to flow around and inside the block (5), containing hydrostatic resin pressures and checking resin consumptions through a formwork; directly supporting through the block (5) the thrusts generated by pressure differentials; when preparing the block (5), assembling the stone slabs (1) independently from mutual thickness and distance between centers with other stone slabs (1).

14 Claims, 3 Drawing Sheets

PROCESS FOR MANUFACTURING COMPOSITES AND FOR STRUCTURALLY REPAIRING AND AESTHETICALLY FILLING SLABS OF STONE MATERIALS

The present invention refers to a process for manufacturing cured and reinforced slabs made of marble, granite and stones in general.

In construction systems, composite materials, formed by two or more components that are mutually differently connected and integrated, are more and more widespread, each one of these components providing the material with characteristics by interacting with the other component(s), such composite materials having characteristics and performances that exceed those deriving from the sum of characteristics and performances of the single components. The composite technologies in fact allow designing materials and products with the desired characteristics.

It is logical that the technique of composites is also explored to improve stone products and correct those characteristics that impair their use. Marble, granite, onyx and stone in general, apart from their aesthetic and decorative values, have an optimum level of physical and technical characteristics as regards compressive strength, often the taking of a good polish, durability and the like, but have a modest tensile strength and often are structurally defective. The raw material, that is the block extracted from a quarry, is a natural material that has been formed during millions of years of a continuous transforming of the earth crust: it is not an homogeneous raw material like other ones, that are industrially produced through controlled melting processes or the like. The block structure is therefore normally defective. For this reason, the slabs obtained by sawing the blocks, of which they are whole sections and therefore with a great surface dimension (from 2 up to 6 m$^2$) must be produced at a minimum thickness of 2 centimetres: therefore they are heavy and brittle, and often defective for the presence of physical flaws, cracks and crevices. The natural stone's structural deficiencies affect all following workings, such as structural repairs, surface finish (polishing and the like), cutting of slabs in smaller formats, and installation. The high weight per surface unit, the brittleness and the failures of the resulting products finally greatly affect the possible use of stone materials, limiting their use.

The sectioning into slabs of blocks having a squared and regular shape, is performed with gang-saws equipped with a plurality of reciprocating parallel blades.

The sectioning of blocks with machines equipped with diamond disks, commonly called block-cutters, allows directly obtaining smaller formats, and therefore, if so desired, also thinner tiles, without having to perform the preliminary step of manufacturing slabs. The choice between manufacturing slabs from which the required smaller sizes will afterwards be obtained or directly manufacturing small-sized products in standard modules, depends on the more or less squared and parallelepiped shape of the blocks, on the type of material, on the plant location in relation to the quarries, and on the type of product that the company wants to make available.

The structurally sound materials, such as white crystalline marble, some compact limestone and many granites, can be sawn into thinner slabs using a multi-blade gang saw and could allow the production of small tiles, by sawing the block in slabs 10 or 12 mm. thick and afterwards obtaining small sizes therefrom. But, since such thin slabs have in real terms no practical uses as slabs (for their insufficient tensile strength), and that the production of thin tiles through such working cycle could result as more costly, and would require a substantial modification of the production plant with respect to the normal cycle, the technical alternative of sawing thin slabs with multi-blade gang saws is scarcely used, and only for special and limited productions.

An elementary form of commonly used stone composite is a slab that is sawn in the standard thickness of 2 or 3 cm. and is reinforced with a glass netting glued onto its rear face: this is a production practice in the industry since 10–15 years. More recently, this slab reinforcement has been associated with the repair of its structural flaws by means of epoxy resins, polyester resins or the like. Such single-component or double-component hardening resins can be formulated so that they are made very fluid and are poured and spread on the slab face, that, after resin hardening, is subjected to surface finish operations. The filling of resins into cracks, flaws and crevices is sometimes helped by passing the slab into a manufacturing line station in which air is partially removed and then reinserted in order to more deeply push the resins into the slab thickness. In the most recent and updated manufacturing lines, the application of the reinforcing net or mat and the repair of structural defects are successively performed on the same line. Colouring of the resins also allows obtaining acceptable aesthetic results.

The technical evolution of stone manufacturing equipment and production lines that are more and more automated and high-speed, and in particular the evolution of slab surface polishing lines, has developed these reinforcement and structural repair techniques, but the results are scarce, partial and costly. It must first be taken into account that these operations on a single slab already require the availability of whole slabs—that cannot be always obtained—and that these slabs can at least be handled, in order to take them to reinforcement and repair lines. This anyway increases the costs for the slabs which break under sawing and for recovering in line those slabs that come out of the gang saw divided into many pieces or that are divided during the following handling.

In order to manufacture thinner, and therefore lighter, reinforced slabs the reinforcing net or mat is applied on both faces of the slab being sawed at a thickness of 2 or 3 cm; the slab is afterwards divided with a diamond wire or disk that cuts it along its medium plane, in order to create two slabs. This operation is slow and costly and must be performed one slab at a time. The thereby-obtained thin slabs can afterwards be repaired and filled as stated before. With the same technique light structural panels can be manufactured, by joining, for example, aluminium honeycomb panels on both faces of the slab, or heavier and stiffer structural panels for different uses: for example partition walls, preliminary panels from which carrier steps or modules for raised floors can be obtained. By modifying the components and their characteristics, thickness, etc. many types of composite panels can be obtained for various uses. The stone surface of the panels obtained thereby can afterwards be repaired in line and filled as stated before.

For more defective stone materials, onyx and most coloured and veined marble, the above-described techniques (related both to standard slabs repair and to their reinforcement with a fiberglass netting on both faces and division on the medium plane to obtain two thinner slabs) are limited by the fact that a block with structural problems is not always able to undergo the sawing under a multi-blade gang saw: the slabs break while being sawn or anyway are divided when it is attempted to lift and transport them. For more precious materials, it is also attempted to rebuild the slab that has been broken and divided into many parts when sawing or in following handlings, by composing it again in the best possible way on the above-described reinforcement and repair lines.

In practice, for very defective blocks, it is often avoided to perform sawing with multi-blade gang saws, also when other block dimensional and squaring characteristics so allow: this for fear that the block collapses when being sawn, with the consequent risks of losing the whole value of the block and with risks for the gang saw integrity itself. It is preferred to use them, as is done for shapeless blocks, to manufacture small slabs with reduced height from which standard tiles are afterwards obtained, with diamond-disk block cutters. The risk is thereby reduced to the loss of the parts of defective material, without risks for the machine.

Some attempts have been made and some Patent applications have been filed, both to obtain a plurality of thin slabs directly from the block with a multi-blade gang saw (without having to perform the sawing step for producing slabs of 2 or more cm. and their following individual division on their medium plane), and to manufacture, reinforce and structurally consolidate a plurality of slabs under vacuum (without employing manufacturing lines in which the slabs are individually treated in a sequence), hoping to obtain better qualitative results and lower costs.

As regard the manufacture of thin slabs directly from a block, the patent U.S. Pat. No. 4,177,789 uses a double-sawing process with multi-blade gang saw. In order to saw slabs whose thickness is 7 mm. only, for example, the process provides for the pouring of a setting fluid filling product that expand in a foam in the cuts of a first sawing of the block performed at a thickness of two cm., such sawing being stopped a couple of cm. before the blades section the block on its whole height. Such resins, by expansion and following hardening, connect the interfaces of contiguous slabs. It is therefore possible to perform a second sawing of the block through its entire extent along intermediate planes of the preliminary slabs, displacing the block position with respect to the cutting blades. To the thereby-obtained 2-cm thick sandwich, that is composed of a pair of slabs about 7 mm. thick, interconnected at their base by a common portion not sawn, and temporarily mutually joined by the hardened foam that adheres to their interface and is sufficiently sturdy as to prevent the slabs from opening along their fracture lines, a layer of a solid reinforcement material, also composed of a netting of fiberglass and resin, is afterwards added on both faces to increase the slab tensile strength and to keep mutually joined the parts being separated by fracture. The cutting of the common foot follows, together with the removal, through cutting wire or blade inserted between the two slabs, of the foam that was temporarily keeping them united. The surface finish can occur on the sandwich faces before the separation or, after the addition of a reinforcement on both sandwich faces, occurs on the internal faces previously connected by the foam, after a possible structural repair or a simple aesthetic filling.

With respect to the manufacture of a plurality of slabs and their simultaneous reinforcement with a solid reinforcing material and the structural repair thereof in a single process, patent EP-A-0344619 also provides for a double sawing of the block. After the first sawing, similar to the previously described one, fiberglass nets or reinforcing sheets are inserted into the clefts created by the cutting blades, such nets or sheets being dry positioned between contiguous slabs and being mutually separated by a release layer of plastic material to prevent the mutual sticking of the slabs in the following impregnation process. Such process is performed in an autoclave under vacuum, with suitably colored hardenable fluid resins. The whole block is contained and impregnated with resins inside an upward-open metallic formwork that is closed at its base and on its four sides by sturdy metallic walls, mutually connected by interposing liquid- and gas-tight sealing gaskets. The following sawing, operated along intermediate planes of the preliminary slabs, directly provides thin slabs, reinforced on one face, that are repaired and filled in all their structural discontinuities. The process limits could be found in the high manual operations required for inserting reinforcing sheets and release sheets in the thin fissures creates by the blade cutting and in the difficulty of adapting the containing formwork sizes to the always different block sizes. A reduced resin consumption, and a consequent acceptable cost per square meter of the final product, are in fact made possible only by well controlled and very reduced tolerances between formwork and its contents.

Also the process described in patent U.S. Pat. No. 5,226,402 reaches the same result with a similar impregnating process, starting however from previously-sawn slabs at a double thickness with respect to the final one that has to be obtained, plus the blade or diamond wire cutting thickness. The slabs are horizontally stacked on one of the 2 longitudinal walls of the metallic formwork, alternating them to a plastic sheet that cannot be glued having release property with respect to the resin and to the net or mat or perforated steel sheet or the like composing the reinforcements, placed on both slab faces, with process and control instruments and by using spacers that allow placing the slabs with a distance between slab intermediate planes equal to the one for the cutting blades assembled on the gang saw. The thereby-built block, formed by the plurality of slabs and of the intermediate reinforcing and separating layers and assembled on one of the two longitudinal walls, is afterwards closed into a formwork composed of a bottom and of the other three walls that are mutually connected, interposing liquid- and gas-tight sealing gaskets. After a 90° rotation of the formwork, this is inserted into an autoclave for the impregnation process under vacuum with clear or suitably colored hardenable fluid resins. After resin setting, the block is extracted from the formwork and placed under the gang saw with the intermediate plane of the slabs corresponding to the position of the cutting blades, in order to saw them according to their medium plane, obtaining from each one of them, after a perimeter cut to remove the resin joining them, two thin reinforced slabs, that are structurally repaired and filled. The process limits can here be found in the difficulty and in the numerous manual operations required for accurately adjusting the intermediate plane of each slab with respect to the gang saw cutting blades and, again, the difficulty of accurately adapting the containing formwork sizes to the block sizes composed of a plurality of stone slabs and intermediate layers, to avoid an unacceptable waste of resins.

The recent patent EP-A-0962430 seems to open the way to relevant progresses in stone material working processes, with the artisan works that are more and more replaced by a completely industrial process in the stones transforming activities. It is related to an impregnation and repair process of structurally defective blocks of stone material by means of hardenable fluid resins. According to this impregnation process in an autoclave under vacuum, all structural failures and internal block areas wherein the material is lacking and that communicated with one of the six faces of a substantially parallelepiped block, are filled with a fluid resin that, when hardening, mutually welds the fracture interfaces, fills the area where material is lacking and strengthens the friable block parts. This process allows the following sawing with a multi-blade gang saw also of the most structurally defective and less originally reliable blocks, without any risk that the slabs break and that, in extreme cases, the block collapses when sawing it, with the various problems deriving therefrom.

With a curing process in autoclave for the structurally defective blocks, a setting fluid resins being introduced into the flaws under vacuum, the slabs with a traditional thickness can be obtained by sawing through multi-blade gang saws, without them being subject to break and be divided into many parts. These slabs are made homogeneous in their mass and therefore have no need of a reinforcement and further structural repair. With the availability of such process, moreover, to the chance of sawing the sound stone materials in slabs whose thickness is 10 millimetres or less, directly from multi-blade gang saws, that is white crystalline marble, some compact limestone and granites in the majority of marketed types, the chance is added of having thin slabs also for structurally poor stone materials.

Object of the present invention is solving the above-mentioned prior-art problems, and providing an access to solutions, technical results and composite materials that so far could not be obtained, unless treating the individual slab either with preparatory phases on a plurality of slabs in an autoclave, but with less available options, lower quality and at higher costs, in a process in which a plurality of slabs made of stone material are simultaneously treated, in a block formed of said slabs and of intermediate reinforcement and/or integrating layers and/or of separating sheets with release property with respect to the resin placed between the individual slabs of stone material or between one group of slabs of stone material and the other, said slabs being juxtaposed to other materials upon assembling, or with other slabs made of stone material, to be mutually strictly connected.

The present invention allows obtaining, with the same production process:

A) slabs of stone material, even structurally healthy, particularly made of granite, with the addition of resins to the surface to fill-in surface recesses and porosities of the material and allow better polishing it. Where a thickness calibration of the slabs is required, such thickness reduction and equalization operation will be performed first on the rear face;

B) slabs of stone material 1 cm. thick or less (or 2 cm. thick and more, to be divided before the surface finish on the medium plane or on multiple planes in order to produce many units), core-cured in their structure and aesthetically filled, aimed to be cut into small formats for which the tensile and bending strength is enough for their use, even without adding a rear reinforcement;

C) slabs made of stone material, particularly thin slabs sawn at a thickness of 1 cm. or less, reinforced with an armature that highly increases their tensile strength (simultaneously increasing their bending strength, when the load is applied to the visible part), such armature being composed of glass fibers or nettings, carbon fibers, fibers, mats, nettings or fabrics of any material characterised by a low tensile elongation, or of perforated and stretched sheets made of galvanized steel or stainless steel, or of other materials and alloys, with the simultaneous structural repair and aesthetic filling of the stone material;

D) slabs made of stone material that are coupled with other slabs made of stone material or slabs or sheets of protection material or the like, for example slabs made of glass or layered glass, or composites made of other materials, for example aluminium honey-comb panels, with an intermediate liquid-permeable reinforcing layer, or even mutually at direct contact, with the simultaneous structural repair and aesthetic filling of the stone material.

A further object of the present invention is the one, very important in operating and economic terms, of providing a process that allows directly obtaining such results with a resin impregnation in an autoclave under vacuum in variable formwork which adapt itself to the various block measures, reducing resin consumptions and without having to use heavy containing formworks to be disassembled and reassembled during every process, with related cleaning of walls and perimetrical liquid- and gas-tight sealing gaskets or sealing strips or their replacement, and with adaptation problems of such formworks to the always different slab sizes as regards length and width, and to the global block thickness, that is determined by the number of slabs assembled into the heterogeneous block prepared for being impregnated.

Lastly, another object of the present invention, in the environmental field, is realising the drastic reduction of volatile substances that are dispersed into the environment in comparison with the ones produced, for the same quantity of square meters treated, by an individual reinforcement and repair line.

The above and other objects, results and advantages of the invention are obtained by a process as claimed in Claim 1 and by its adequate variations, as claimed in the dependent claims. In particular, the process of the invention is used to prepare, structurally repair and aesthetically surface finish under vacuum, and possibly reinforce with different types of backings, and possibly join one to the other or to slabs made of other materials, a plurality of slabs made of stone material, by adopting a disposable liquid- and gas-tight containment envelope of the size defined by the same pack of slabs forming the heterogeneous block, that is contained within structures that are always protected against the contact with impregnation resins.

These and other objects of the invention will more clearly appear from the following description, with reference to the enclosed drawings of preferred embodiments of the invention, provided as a non-limiting example and in which.

Figure 1:
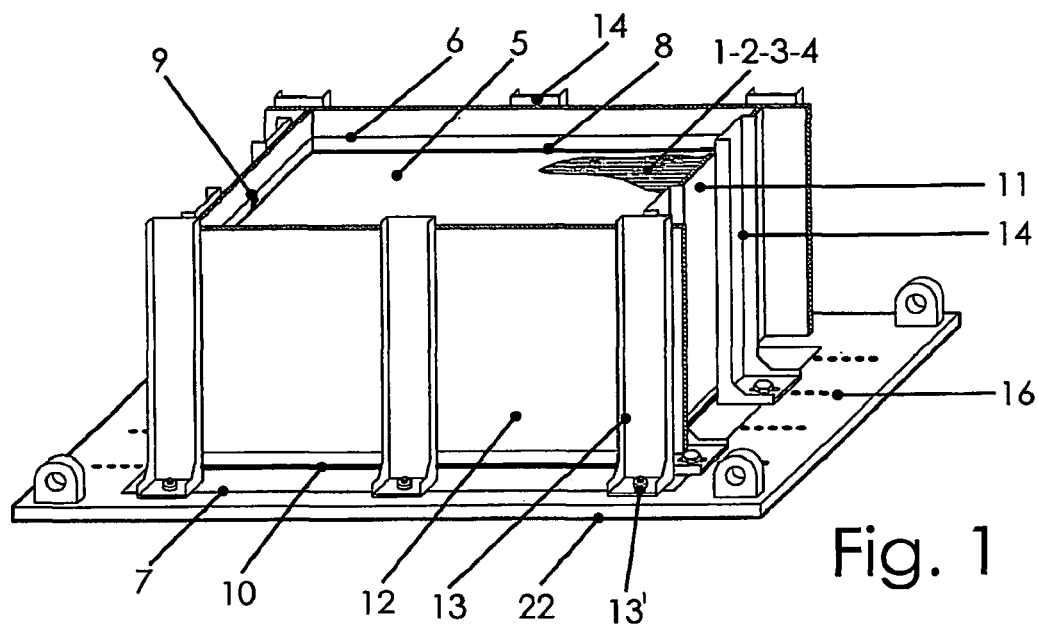
FIG. 1 is a schematic perspective view of an heterogeneous block to which the present invention is applied.

In FIG. 1, an heterogeneous block is shown that is built with slabs made of stone material with a sawing plane on both faces or gauged on one or both faces and therefore lacking preliminary reinforcements composed of nets or glass fibers sprayed on the faces together with resins, and layers of other liquid-permeable reinforcement materials and other possible sheets and slabs connected to the slabs made of stone material, or not-stick sheets that instead keep the mutually-connected materials separated. The block is impregnated with liquid and hardenable resins, with vertically-arranged slabs and layers, and the block itself is externally coated, on its base and on its whole perimeter, with sheets made of liquid- and gas-impermeable materials forming a vessel that is upward open only, such sheets being mechanically kept against the block formed by the plurality of stone slabs and sheets or slabs made of other materials, by interposing liquid-permeable reinforcement layers or sheets equipped with grooves for an easy resin flow. The sheets are kept against the block by the weight of the block itself in the support area of a process platform supporting it and by at least four structural plane panels connected thereto, such panels being kept adherent to the block by rigid containment brackets that are strongly secured to the platform. These structural panels substantially cover the longitudinal vertical surfaces and the surfaces of the two block heads.

Figure 2:
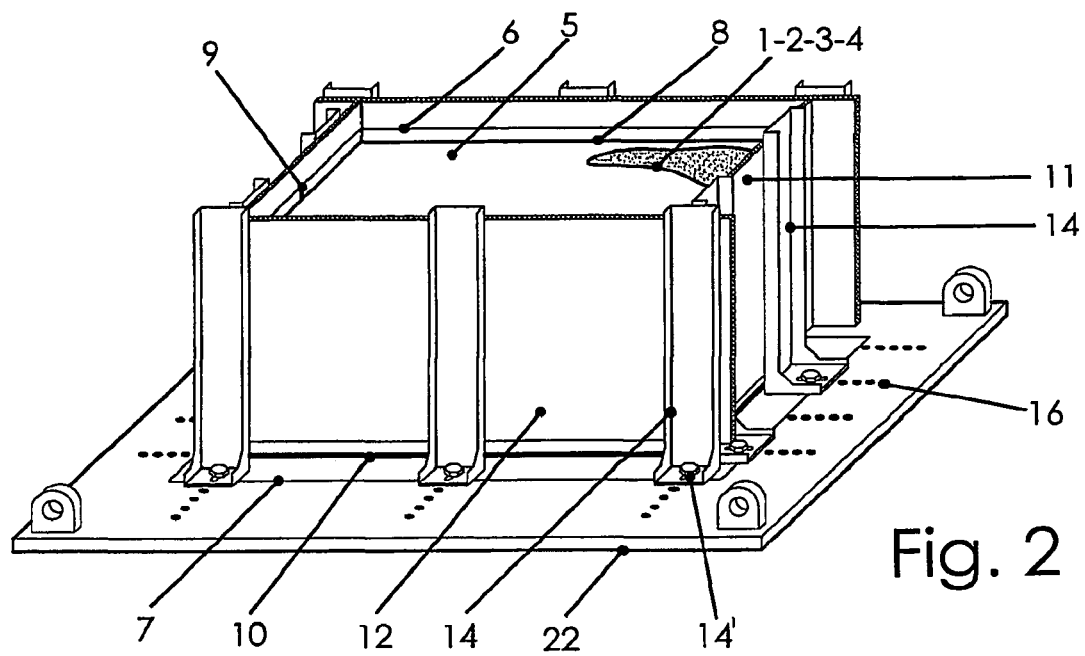
FIG. 2 is a schematic perspective view of a variation of the block shown in FIG. 1.

FIG. 2 instead shows a schematic perspective view of a block that is similar to the previous one, but with the slabs made of stone material and the other layers that have been horizontally assembled on the process platform that is used to support and transport the block.

Figure 3:
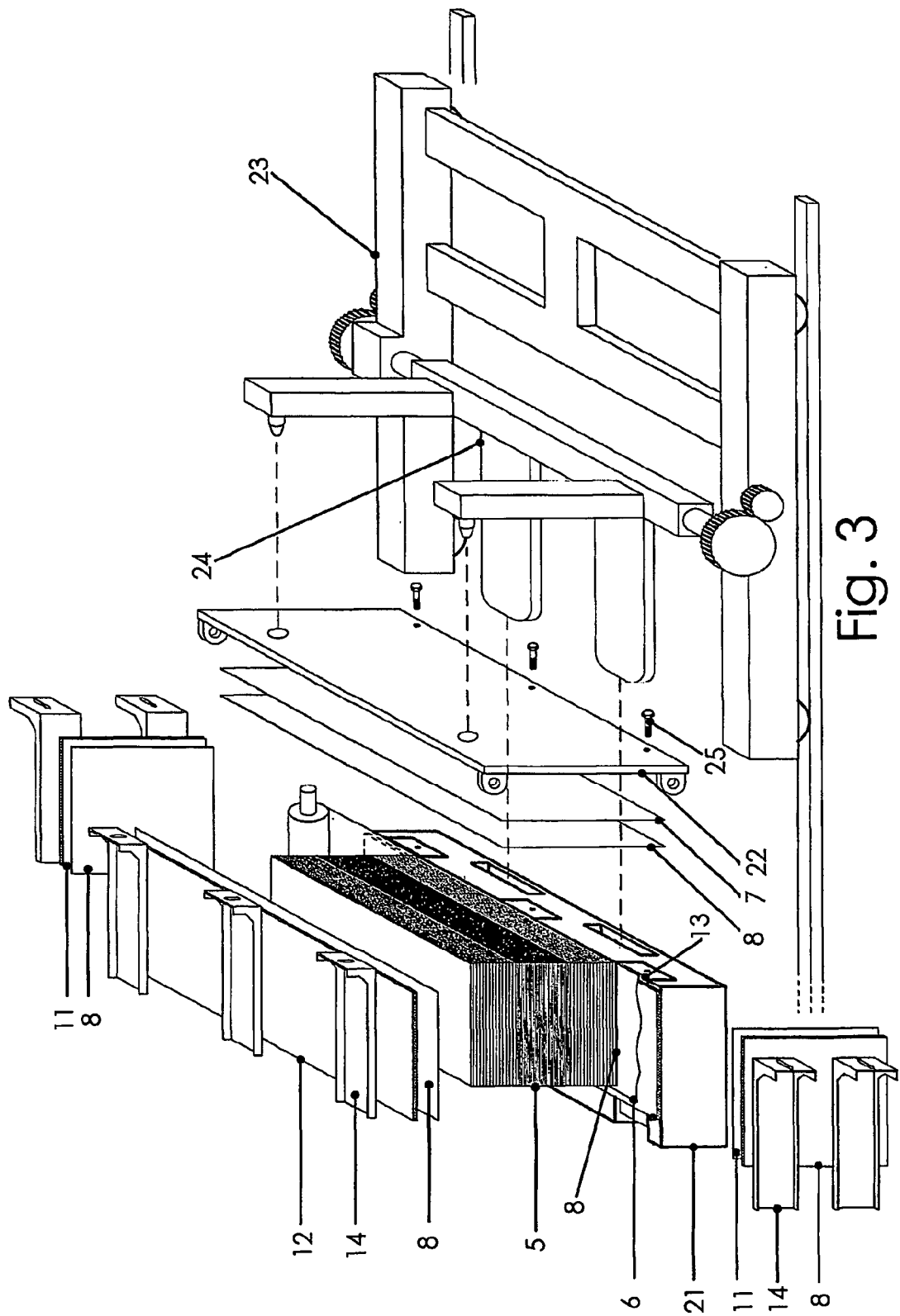
FIG. 3 is an exploded perspective view of a possible way for assembling the block in FIG. 1.

FIG. 3 is referred to the assembly of the block shown in FIG. 1 and shows a block at the end of the dry assembling step of all slabs and sheets composing the layers and that have been positioned for the process in a preliminary horizontal arrangement, having as abutment one of the longitudinal structural panels forming the rigid vessel, such panels being preferably light and composed, for example, of a honeycomb-shaped aluminium panel that is over five centimeters thick or also composed of mutually joined panels with a lower thickness. The first panel is first covered by a sheet of liquid- and gas-impermeable material, of such a length as to wrap the whole block perimeter and of a width exceeding by some centimeter the slab height, and then, by a liquid-permeable sheet whose length is slightly less than the slab length and whose width is equal or exceeding by some millimeters the slab length, such panel composing, after the 90° pack rotation, the cover of one of the vertical surfaces of the pack of slabs, such panel being supported by a general abutment structure whose plane is also composed of the plane part with at least three rigid securing brackets that are housed in the structure. The panel can be afterwards connected by means of brackets to a process platform that is computed to support, without being subjected to planar distortions, the whole load of block and related process supports: such platform is preferably reinforced with stiffening beams on its rear face, not shown in the drawings. The process platform approaches the block in a vertical position, supported by a trolley that runs on tracks and that can rotate by 90 degrees on a fulcrum and that has forks available that are arranged at 90 degrees with respect to the process formwork abutting plan; the forks are aimed to be inserted into suitable seats of the general bearing structure when the process platform approaches the assembled block, by interposing a liquid-permeable sheet, whose size in width is slightly less that the height of the stacked slabs and whose length is a bit less, placed towards the block and arranged in a centered position with respect to the pack of slabs, and a sheet made of liquid- and gas-impermeable material, abutted to the platform, whose size is a few centimeters greater both in width and in length, than the height of the pack of slabs and their length and is arranged in a centered position with respect to the pack of slabs, while the liquid- and gas-impermeable perimeter covering sheet is ready to be wrapped around the pack and its edges welded at its ends, while the second longitudinal panel and the two heading panels are ready to be made approach the block and afterwards to the welding and secured to the platform to complete the closure of the whole pack of slabs by means of the brackets screwed to the process platform, to afterwards rotate the block by 90, having it ready for the impregnation process. The system for approaching the block assembled on the process platform can be modified at will, for example by assembling on wheels or rollers the general bearing structure and then approaching the block to the process platform anchored to a block upturning structure that can be normally found on the market.

Figure 4:
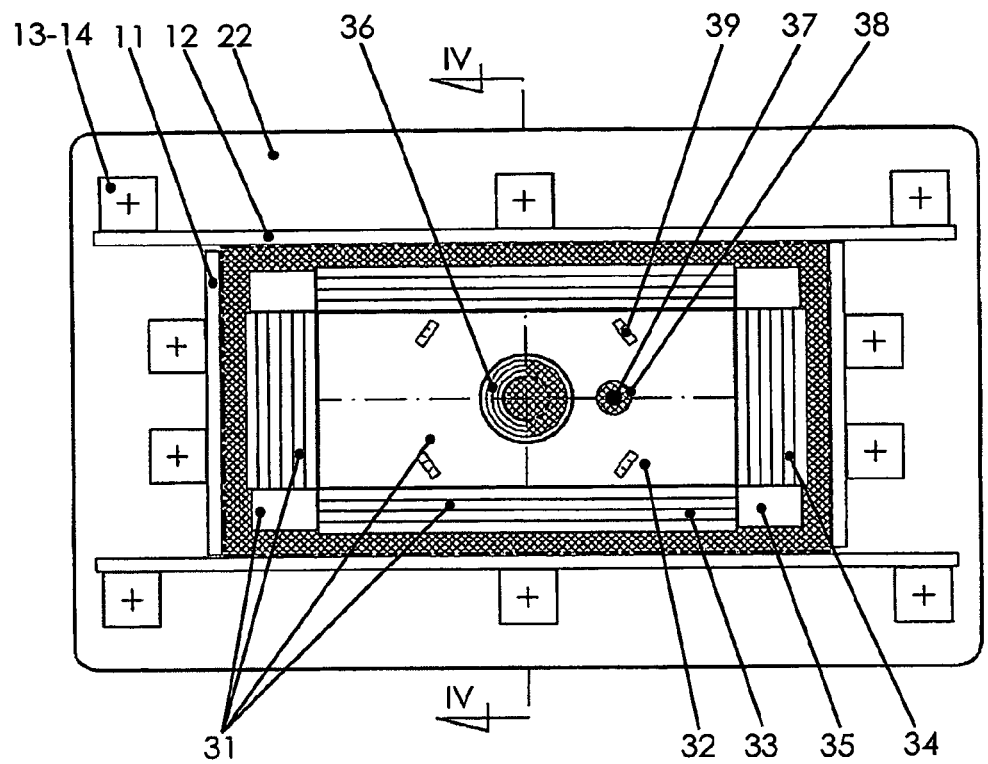
FIG. 4 is a top plan view of the block in FIGS. 1 and 2.
Figure 4A:
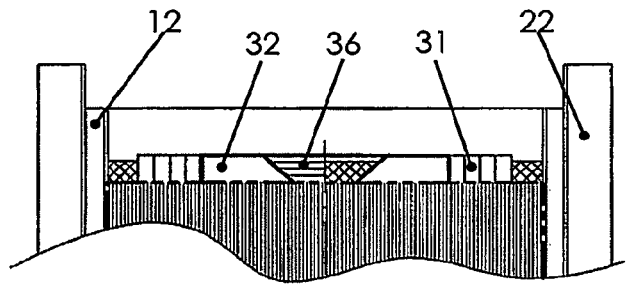
FIG. 4A is a sectional view performed along line IV—IV in FIG. 4.

FIGS. 4 and 4A show the block in FIGS. 1 and 2 in a top plan view, with an upper cover made of liquid-impermeable material, composed of a central core and of longitudinal, transverse and angular prostheses with adequate weight and thickness, whose function is concentrating, on a reduced area, but many cm thick, the resin covering the upper face along the perimeter block edges and in the central through-hole in order thereby to better check the remaining resin level and to timely decide the possibly necessary resin toppings up, reducing resin waste and consumption.

Figure 5:
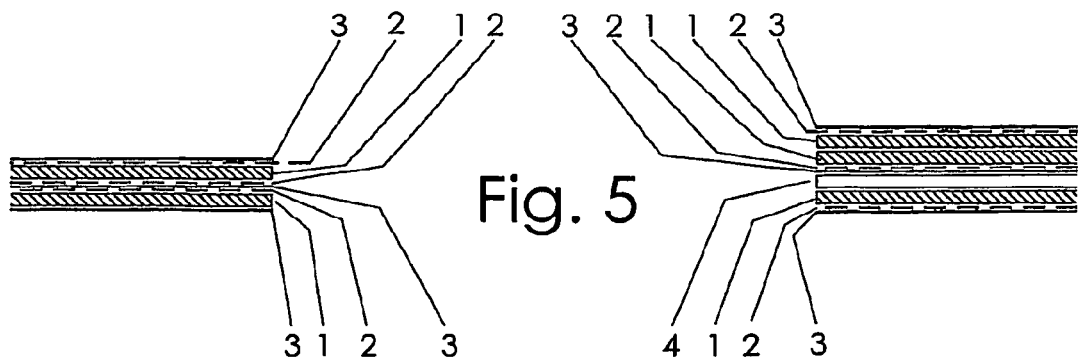
FIG. 5 is a side view of two examples of composites realized with the process of the present invention.

FIG. 5, finally, shows some examples of composites and the assembly order in which slabs made of stone material are juxtaposed to fiberglass nettings, sheets of drilled and stretched galvanized steel and other sheets made of reinforcing materials, arranged against one of its faces or both; or juxtaposed to other slabs of stone material and/or slabs of miscellaneous materials and/or sheets and nets or reinforcing sheets, with intermediate not-stick plastic layers separating the assemblies, even heterogeneous ones, arranged in an assembling succession of the multi-layered block, and the following group.

With reference to the above Figures, the process of the invention will now be described, that allows obtaining the above-mentioned objects in an heterogeneous block composed of many layers, hereinbelow simply called "block".

The following description will always refer to blocks 5 composed of slabs 1 of stone material, and other layers 2 of liquid-permeable reinforcement material, layers 3 of impermeable plastic material and on which the resins cannot stick to and layers 4 of slabs or sheets or panels of non-stone materials, even when the sequence is limited to alternated layers such as 1-3 or layers 1-2-3 in their different combinations. The above-mentioned arrangements must therefore be deemed as equivalent as regards the inventive process: in particular, but in a non-limiting way, the arrangement providing the slab 1 and another layer 3 is adapted to realize the applications that were previously designed by references A and B; the arrangement providing the slab 1 and the layers 2 and 3 is adapted to realize the applications that were previously designed by reference C, and the arrangement providing slab/s 1 with layers 2-3-4 is adapted to realize the applications that were previosuly designed by reference D. Sometimes the permeable layer 2 is replaced by the layer 2' in which the resin is allowed to flow not by the material permeability, but by notches obtained in said continuous impermeable sheet 2', on one or both its faces, where said notches are not directly obtained on the stone slab 1 to which the continuous impermeable sheet 2' with constant thickness is juxtaposed. The separating sheet 3, in turn, can have a constant thickness or have on one or both faces some projections that are adapted to allow the resin flow towards the face of stone material to which it is juxtaposed.

The slabs 1 made of stone material, of the same measures since they are coming from sawing of a previously squared block, or because they are so prepared with cutting operations following the sawing, are first preferably washed on both faces and then anyway heated at a temperature of 50/60° C. to have available, at the end of assembling the block 5, a residual thermal mass in the slabs 1 and in the block composed of the slabs 1 and of other intermediate layers of the same sizes, layers 2 of reinforcement material, layers 3 of not-stick plastic material, layers 4 of other non-stone materials, suitable to allow a perfect drying under vacuum, without forming ice. This heating can be obtained by passing the slabs 1 into an oven or with other known means: infrared rays, microwaves. etc.

The assembly of the block 5 shown in FIGS. 1 and 3 horizontally starts on one of the two longitudinal panels 12, whose length is at least twenty centimeters greater than the maximum length of the slabs 1 made of stone material that can be obtained from a gang saw and whose width is at least ten centimeters greater than the maximum slab width that can be obtained by sawing with a multi-blade gang saw or the maximum width of the slabs 1 that has to be treated. The panel 12 is abutted onto a sturdy general bearing structure 21 where three stiff containing brackets 13 are for example housed, whose plane part is at the same level as of the bearing planes of the structure 21, in order to guarantee a continuous bearing plane. The foot of the brackets 13, placed at 90°, is provided with a threaded hole to secure the brackets 13 to the process structure 22, with screws 13' passing through holes obtained therein.

The panel 12 is abutted onto the upper plane of the structure 21 in a backward position of a few centimeters with respect to the longitudinal alignment provided for the slabs 1 and the other layers 2, 3, 4. Therefore, above the panel 12, a liquid- and gas-impermeable sheet 6 is laid, placed on the same alignment line of the slabs 1 and the other layers 2-3-4, one edge of which is left project from one short side, whose length is such as to be afterwards able to wrap the whole block 5 and joined together at the ends when the assembling of block 5 will be completed.

The sheet 6 is prepared with a width of about ten centimeters greater than the slab width, with the exceeding part projecting from the opposite part to the longitudinal starting alignment of the slab assembling, in order to be able to afterwards form, above the block 5, a containing basin for the amount of resin that is enough for the process, after a 90° rotation of the block 5 itself.

The sheet 6, aimed for the perimeter wrapping, is liquid- and gas-impermeable also when the pressure exerted on its external face placed against the longitudinal panel 12 and against the other similar panels that, with the process platform 22, form the containing structure, is by some atmospheres greater than the one exerted on the internal face oriented towards the block 5. Moreover, the sheet 6 is formed of two or more mutually joined sheets of impermeable material, to guarantee the impermeableness even if one of them is drilled or defective; the sheet 6 must further be sturdy and scarcely extensible to be able to be perfectly stretched and taken to adhere to the block perimeter. For these purposes, the various sheets, mutually integrated in a single multi-layered composite sheet, can use different types of plastics, polypropylene, polythene, polyester, PVC, polyamide, etc. possibly alternated to aluminium sheets. It is advisable that the internal layer of the sheet 6, in contact with the block 5, is made of a plastic material that cannot be glued to the block by the resins used for the impregnation process, so that the block 5 itself can be easily freed from the envelope after the resins have hardened and is further adapted to be welded on itself, preferably by thermal welding.

Over the portion of the sheet 6 bearing on the panel 12 a first sheet 8 is then placed that is made of liquid-permeable material, that can be composed of one layer or two of glass fiber or other woven material, or simply of fibers oriented in order to make the resin flow easier, or, and preferably, a continuous sheet with projecting areas arranged with their positive towards the block 5 and such as to form a grid for making the impregnation resins flow. The sheet 8 has a length that is equal or by a few millimeters less than the length of the slabs 1 and a width that is equal or by a few millimeters greater than their width and projecting, for the excess part, from the opposite part to the layer assembling alignment. It is advisable that also the continuous sheet 8 is chosen among those plastic materials that the resin cannot glue, so that it does not attach itself to the block 5 and allows being able to easily remove it at the end of the process.

The slabs 1 are horizontally placed, for example with the help of lifting means and a plate equipped with suction cups, and alternated with reinforcing sheets or nets 2 of any type and with sheets 3 of plastic material, to which the used resin cannot adhere and that insulate the different layers or, for other composites that can be obtained with the same process, slabs 4 made of different materials that are aimed to be strictly connected to the slabs 1, for example slabs made of glass, or layered glass, or tempered glass, or even slabs 1 of the same or other stone material, in groups containing any type of reinforcing nets or sheets 2, mutually separated by sheets 3 made of not-stick plastic material.

When the dry assembling of all slabs 1 and the other layers has ended, on the upper face of the block 5, and that is on the last assembled layer, a liquid-permeable sheet 8 is placed, whose length dimension is equal or by a few millimeters shorter that the length of the slabs 1 with the projections oriented towards the block 5, if the permeable sheet is of the type in which the resin is made flow in a grid of channels, and a width equal or by a few millimeters longer than their width and projecting, for the excess part, from the opposite part to the assembly alignment of the layers. Other two sheets 8 are afterwards placed against the two heads, unless it is chosen to cover the upper face and the two heads with a continuous sheet 8.

Afterwards, the sheet 6 is wrapped around the block 5 and the sheets 8 and its extreme edges are mutually welded with a welding or other liquid- or gas-impermeable connection means (reference 9 in FIG. 1).

Then, the second longitudinal panel 12 is abutted on top of the block 5 and is placed by a few centimeters displaced towards the end part of the block 5 with respect to the starting slabs alignment, taking care that the sheet 6 below has no plies or wrinkles.

The panel 12 can possibly be loaded with weights to exert a layer compactment pressure.

A trolley 23 is then provided, equipped with forks 24, suitable to overturn by 90° the two bearing planes with which it is provided, one being represented by the forks 24 and the other one aimed for positioning and securing the process platform 22. Such trolley 23 can be replaced by another system comprising a rotation fulcrum with means for approaching the process platform to the block 5. On the trolley 23 the process platform 22 is plane-loaded and on the platform a base impermeable sheet 7 has been or is placed, having the same liquid- and gas-impermeableness characteristics and substantially the same composition as of the sheet 6, by some centimetres wider and longer than the height and the length of the longitudinal wall of block 5 and centered to it.

The arrangement with a trolley 23 equipped with forks 24 is obviously a non-limiting example: it is also obviously possible to provide a mirror-like equivalent arrangement, wherein the block 5 is moved on wheels or rollers (not shown) and taken next to a common upturning device on which it is loaded in order to be upturned at 90°.

Above the sheet 6 made of impermeable material, a permeable sheet 8 is placed that is by a few millimeters shorter as width and length than the height and length of the longitudinal wall of block 5, formed by the stacked layers 1-2-3-4, and then the trolley 23 is made approach and the forks 24 are inserted into the suitable housings inside the general bearing structure 21. Afterwards, the process platform 22 is stiffly secured with screws 25 through (for example) three through-holes of the platform to the three threaded holes placed at the base of the three brackets 13 housed into the general bearing structure 21, thereby securing the longitudinal panel 12 on which the block 5 has been assembled.

The longitudinal panel 12 arranged above the block 5 is then secured, for example with three brackets 14, equipped with a slot arranged in the bearing foot at 90°, with screws 14' passing through the blind threaded holes 16 obtained into the platform 22 and that can be reached through said slot. Since the height measure of the horizontally-arranged block 5 is determined by the number and thickness of the assembled slabs, and is widely variable from block to block, a plurality of blind threaded holes 16 are provided on the process platform 22 for securing the brackets 14, with a distance between centers equal to some centimeters between an hole and the following, with the series of holes arranged on three rows, that are not shown in FIGS. 1 and 3.

After that the brackets 14 have been stiffly secured to the platform 22, it is possible to proceed with the assembling and securing of the head panels 11; then, the block is rotated by 90°, or, according to the operating choices that are deemed as more adequate, the block is rotated by 90° and afterwards the heads are closed with the related panels 11, placed inside the longitudinal panels 12 and displaced by a few centimeters with respect to the starting assembling alignment, in order then to secure the panels 11 with brackets 14 with screws 14' inserted into the blind holes 16 of the rows of holes that are deemed as most appropriate, placed on the process platform 22. Such head panels 11 have the same width dimension as the width of panels 12, but, not being able to have a unified measure in length, because such length depends on the number and thickness of layers 1-2-3-4 and on the measure deriving therefrom, they must be present in the plant in pairs with different length in order to be able to choose and use, for each block 5, the most suitable pair to minimize the area in which the hydrostatic pressure exerted on the resin in the impregnation process can operate on the liquid- and gas-impermeable sheet 6 that is not supported by the panels 11. The possible plies due to excessive length of the sheet 6 deriving from the compactment of block 5 can be housed inside the reduced tolerance clearances that are left uncovered between each panel 11 and the panels 12 between which this is placed.

The impermeable sheet 6 that is wrapped around the perimeter of block 5, previously welded with itself at the extreme edges, and the sheet 7 arranged at the base of the slabs 1 and the intermediate layers 2-3-4, are mutually joined, with an operation that is made easier by the edges that are left accessible by the related distance with respect to the base of the process platform 22 of the longitudinal panels 12 and the head panels 11 and the thickness of panels 11 and 12. Joining occurs through a welding process with structural adhesive, of the "hot melt" type or the like (reference 10 in FIG. 1), that is liquid- or gas-tight, in order to close the impermeable envelope surrounding the block 5 on five faces, leaving it open on its top. In case of treatment of very high blocks, that generate particularly high hydrostatic pressures, it is possible to support on the perimeter and on the four sides the impermeable sheet 6 next to the base of the block 5, with stiff containment beams (not shown) anchored to the process platform 22 or to the brackets 13 and 14, and placed between the brackets 13 and 14 and the perimeter of the block 5 to cover the clearance between the welding (reference 10 in FIG. 1) and the lower edge of panels 11 and 12.

In the block 5 variation shown in FIG. 2, with the different layers 1-2-3-4 assembled and afterwards also impregnated in an horizontal position, a simpler block assembling system is used. With this type of horizontal placement of the layers 1-2-3-4 and the following impregnation with the horizontally placed slabs the need increases of having available inside the autoclave a higher vacuum level and of having available higher positive pressures, for the greater difficulty of filtering the resin up to the center of the layers. Through such horizontal arrangement it is moreover indispensable, limited to some among the products that can be obtained from the process, to remove from the resin all the air contained therein in emulsion or in solution, that would find it more difficult to migrate from inside the layers and go out to reach the upper face of the layer of resin and be dispersed in vacuum. The different compression of the layers 1-2-3-4 must also be taken into account, such compression being determined by the weight being exerted at the different stratification levels of the block 5, giving precedence to assembling the most compression-resistant materials and suitably programming the block 5, if it contains composites of different types. It is also advisable to load the upper face of the block 5 with a meaningful weight, of such a shape as to guarantee an homogeneous load, such arrangement helping to partly homogenize the different loads between the different stratification levels.

In the block 5 variation shown in FIG. 2, the block 5 is directly assembled on a process platform 22 that is free from through-holes and is equipped with rows of preferably blind, threaded holes on all its four sides. Such assembling uses the same previously-described components, apart from the brackets 13, and does not use a structure 21 and a trolley 23.

The assembling of block 5 in the variation in FIG. 2 starts by arranging a base impermeable sheet 7, longer and wider than the stone slabs and other layers, and a permeable sheet 6 by a few mm shorter and narrower than slabs and layers, both sheets being centered with respect to the positioning of the pack, and goes on by alternating slabs 1 made of stone material and other layers 1, 2, 3, 4, all being of the same length and width, till the programmed block 5 has been completely assembled. Afterwards, after having covered the four vertical walls of the block 5 with one or more sheets 8 made of permeable material, whose width is equal or by a few mm superior that the global height of the block 5 the permeable sheet 6, by at least 10 cm wider than the height of the block 5, is wrapped around the vertical perimeter. Then, the two ends of the sheet 6 (reference 9 in FIG. 2) are mutually welded or anyway joined with a liquid- or gas-impermeable joint, using arrangements, before the welding 9, that are suitable to stretch the sheet 6 on its perimeter, adhering to the walls of the block 5, in contact with the base sheet 7 and projecting by about ten centimeters over the upper face of the block 5. Afterwards, the longitudinal panels 12 and then the head panels 11 are placed, taking care that their lower edge is spaced by some centimeters from the bearing plane of the process platform 22: in order to do so, temporary shims are employed. Afterwards, the panels 1, 12 are taken in contact with the vertical walls of block 5 and are then strongly secured with screws 14' against the block 5 by means of brackets 14 provided with a slot at their base, into the threaded holes of the process platform 22. Then, the resin containing envelope is closes, such envelope being composed of a perimeter impermeable sheet 6 and of the base impermeable sheet 7, connecting the 90° junction of the two sheets by a seam of structural adhesive (reference 10 in FIG. 2), having liquid- and gas-impermeable characteristics and the possible addition of perimeter containment beams (not shown) for the hydrostatic pressures at the base of the block 5, not covered by the panels 11 and 12.

The process platform 22 and the block 5 strongly secured thereto, as in FIGS. 1 and 3 or as in FIG. 2, is then transported and inserted into an autoclave (not shown), provided with an opening for making the resins enter and preferably with a porthole in order to check the following impregnation process, and the upper face of the block 5 is put at level.

The autoclave is closed and the air contained therein is scavenged under vacuum and in this phase a quick and complete drying of the whole contents is obtained, such drying process being helped by the preliminary heating of the stone slabs and by the steam tension that is progressively reduced when the pressure in the autoclave decreases.

The drying process and the reaching of a vacuum can be accelerated, and the vacuum level can be improved, by condensing the steam being freed as ice on a cold body inserted inside the autoclave or anyway along the air scavenging circuit before the pumps.

After having reached inside the autoclave a vacuum level that is as nearer as possible to zero, but anyway not greater that five residual torr, the clear or suitably colored resin is progressively inserted into the autoclave, sucked by the same vacuum or pushed by a pump, and is poured on the upper free face of the block 5, or also poured into a vessel placed inside the autoclave and afterwards poured onto the block through an outside command when the resin has been sufficiently freed from the air contained therein as emulsion or solution. As an alternative, the resin is inserted from the block base after having possibly freed it from the air outside the autoclave.

For simplicity the term "resin" will be used in the present description to indicate any suitable liquid product which can set. However, two-component synthetic resins (epoxy resins, polyester resins and others) are preferred as the setting fluid filler product.

The impregnating resin, however, has the characteristic that, in longer or shorter time, with or without heating or other accelerating hardening provisions of various kinds, it sets by an internal chemical transformation which, upon completion, causes it to:

adhere strongly to all the walls of the space occupied, except for the not-stick layers;

acquire characteristics of mechanical strength substantially comparable to those of the stone or other material with which it is in contact.

The resin starts penetrating along the walls, under the block 5 and in the interstices between stone slabs 1 and the other various layers 1, 2, 3, 4 that compose the block 5, while a sufficient amount of it is progressively inserted, on a statistical base and by experience, to allow its accumulation on the block 5, till a sufficient amount of resin to complete the impregnation process is formed on the upper face, into the envelope tank formed by the liquid- and gas-impermeable sheets 6 and 7 and contained by the panels 10 and 11 and the process platform 22.

Afterwards, the autoclave is communicated with the outside and the entering air operates as a piston on the fluid resin surface, forcing it to progressively penetrate into all empty spaces of the block 5 that are under the resin level, with an available differential of about 1 kg/cm$^2$. A positive pressure from 0.5 to 6 atmospheres is afterwards introduced into the autoclave to force the resin, pushed by a higher pressure, to complete the impregnation without leaving internal areas that have not been reached by the resin, and weld all microfractures being present in the slabs 1 made of stone material and to be also introduced between the slabs 1 and the reinforcements 2 and other slabs 1 or 4 to be strictly mutually connected and therefore with interstices that are reduced to a minimum, when they are juxtaposed in direct contact.

After having left the autoclave under a positive pressure for an enough time for the complete resin penetration into every empty space available under the general resin cover of the block 5, and taking care that the resin head on the block is enough to avoid that something surfaces, exceeding the upper liquid level and thereby allowing the air to seep inside the block 5 (thereby unavoidably making the impregnation fail), the pressure is discharged at the atmospheric pressure level and the autoclave can be opened to extract the impregnated block 5, that will be left closed into its vessel for the necessary time for the resin to harden. The hardening process can be accelerated by putting the still protected block into an oven, or through ultraviolet rays or other means determined by the type of resins being used for the process. In order to reduce the emission of volatile substances into the environment, these however being very limited due to the modest surface exposed to the air, the resin can be left or made harden inside the closed autoclave, then exhausting to the outside the few remaining volatile substances in a single quick operation, if necessary through a filter.

After the resin hardening, the block is freed from containing structures, brackets 13 and 14 and panels 11, 12, and the disposable envelope, represented by the plastic vessel formed by the envelope made of impermeable material composed of the sheets 6 and 7 and of the sheets of material 8, is etched with a cutting tool and removed from the block 5.

The four perimeter faces, that are normal to the layers 1-2-3-4 composing the block 5, are then cut with a diamond wire or blade at about one centimeter from the edge on four sides and the slabs made of composite materials, thereby made independent, are then sent to the following surface finish operations and the like.

The above-described process of the invention, in the variations shown in FIGS. 1–3 and in FIG. 2, is simple, can be used for slabs of any size obtainable through sawing from a multi-blade gang saw, uses, in order to contain the resins and for the liquid- and gas-impermeableness, a disposable envelope with a modest value with the minimum number of joints and an economic resin-channelling system, that is also disposable. Moreover, the process of the invention promptly re-uses all other process supporting materials composed of containment panels and related securing brackets forming a variable formwork that takes the form of the contained block, to which the task is thereby given to resist to the strong pressures from outside inward, that occur when the contained block is subjected to re-balancing with atmospheric pressure or affected by positive pressures inserted into the autoclave, avoiding to disassemble and reassemble cumbersome and heavy structures that can be adapted with difficulty to the contained block and without the need, after every impregnation, of cleaning walls and gaskets, or of replacing them.

Moreover the resin consumption is reduced, due to the possibility of accurately controlling the tolerances between tank and contained block, the preparation times for the block containing structure and the times required for its disassembly are relatively short, the manufacturing cycle can be repeated many times during the working hours, is simple, flexible and suitable to core-cure, where necessary, the faulty structure of all slabs made of stone material being present in the block and to guarantee the aesthetic filling and to provide, where programmed, the stone slabs with various types of backings that give the slab tensile strength and bending strength, or also to couple the slab to other slabs of the same or other stone materials or of other materials in general, without uncertainties in the results, with a method that is altogether economically and industrially feasible and ecologically correct.

According to the variation shown in FIGS. 4 and 4A, in the process the invention refers to, the consumption of impregnation resins is further limited by a structure 31 that is placed above the block 5 after having ended its assembling: such structure 31 is composed of a material whose specific weight is greater than the resin one and anyway altogether heavy enough to win the hydrostatic resin thrust, and is built with a sufficient thickness so that the resin cannot cover it on the top. The structure 31 is built of a material to which the resin cannot stick on or that is coated with a paint or another protection to which the resin cannot adhere; the structure 31 as a whole is formed by a central square or rectangular part 32, which can be accurately lifted and transported onto the block 5 through hooking means on connections 39, by possible additional longitudinal 33, transverse 34 and angular 35 prostheses, in order to cover the majority of the upper face of the block 5. The structure 31 is composed in such a way that its lower face in contact with the block 5 is provided with projections in contact with the upper face of the block 5 itself, such projections being such as to allow a passing canalization for the resin with a very reduced height. The structure 31 forces the inserted resin to be arranged in a thickness equal to many centimeters in the perimeter corridor defined by its plan encumbrance and by the perimeter inside the impermeable sheet 6 that is contained and supported by the structural containment panels 11, 12. The structure is also provided with a central through-hole 36 with reference notches: the reference notches allow visually evaluating the level, through an inspection porthole (not shown), and allow providing, with a command or a manual action, to insert further resin to avoid that an area of the upper face of the block 5 is uncovered, making air penetrate inside the block and making the impregnation process fail.

It is further possible that the resin level check is automatically performed, and consequently the pumping of resin is automatically controlled when the level drops below the safety level. Such level is checked through a floater that activates a proximity switch or equivalent means, and this floater is placed into the central hole 37, or, to avoid turbulence disturbances, particularly if the resin is inserted from the top, it can be placed through a second dedicated hole 38, communicating, next to the upper face of the block 5, with the main center distance hole 37, used to insert the resin.

Lastly, it is also possible to provide an alternative process in which the block 5 is assembled with layers 1, 2, 3, 4 whose width and length are different from those of other layers 1, 2, 3, 4, where each layer or homogeneous group of these layers 1, 2, 3, 4 has a different size in width and/or length, with the same starting assembling reference in the block 5 at an angle of 90°; moreover, each layer or homogeneous group of layers 1, 2, 3, 4 compensates at the other one or two ends for the resulting missing thickness through shims, for example made of stiff foamed polyurethane, so that the block 5, at the end of its assembling, is a complete parallelepiped, with its six faces free from areas in which the filling material is missing.

Figure 6:
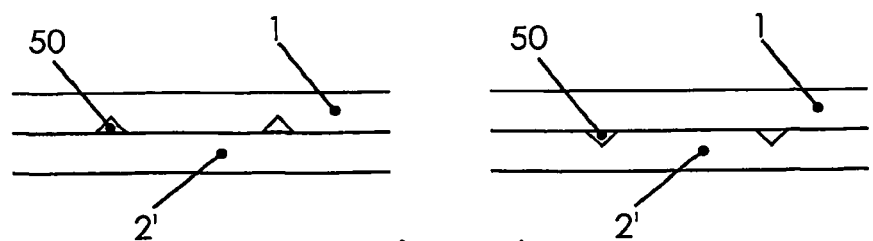
FIG. 6 is a side view of other two examples of composites realized with the process of the present invention.

With the above-described processes, it is possible to obtain a family of composites, which can be obtained by employing all assembling and following impregnation steps of the layers 1, 2, 3, 4 also performed into a formwork (not shown, because it is known) composed of a bottom and four structural stiff metallic walls in which the liquid- and gas-seal is guaranteed by the structures themselves and by sealing gaskets arranged in the mutually screwed connection areas of said stiff metallic structures. Such structures also perform the function of containing the hydrostatic resin thrusts towards the outside and the thrusts generated by the pressure differentials that occur during the rebalancing steps at the atmospheric pressure or when inserting overpressures inside the autoclave, between the outside of the block closed by the four walls, the bottom and the fluid resin head placed on the top. The family that can be obtained is composed of composites formed by slabs 1 of stone material connected to slabs 4 made of glass or multi-layered glass or tempered glass with different modes and sequences and for the different possible functions, also using the characteristic of some stone materials of being permeable to light and also using the glass slabs 4 as a reinforcement adapted to provide tensile and bending strength, even without having to use other sheets or reinforcement nets 2 that would limit the passage of light and would be visible in transparency. The face of the glasses 4 in contact with the slab or slabs 1 of stone material is provided with some longitudinal and/or transverse grooves (50 in FIG. 6) or also arranged according to a design affecting the whole surface of the slab in a substantially homogeneous way: such grooves 50 have a section for example shaped as a V, and have the function of facilitating the flow of the resin and thereby avoid that a pressure differential is formed between the two faces of the glass slab 4 that could break it, the resin being clear in order not to be visible, or coloured in order to obtain decorative or functional designs. Such grooves 50 can also be obtained in a mirror-like opposite way, and that is into the stone material 1 juxtaposed to the glass slabs 4. As further alternative, with reference to FIG. 6, layers 2' could be used, for coupling with the stone material 1, such layers 2' not being composed (like the layer 2) of resin-permeable material, but of materials like stainless steel, phenol stratified material and the like. Also in this case grooves 50 are obtained alternatively in the layer 1 of stone material or in the layer 2' of non-resin-permeable material. This allows, first of all and in an evident way, to save resin that is injected into the grooves 50 but that also expands as a film into the very thin interstices between layers 1 and 2', so that the flame load of the product is drastically reduced, with obvious benefits for the end products used in the naval field and wherever a high level of fire protection is requested. The present invention finally relates to the products in general obtained with the above-described process, two general examples of which are shown in FIG. 5.

What is claimed is:

1. Process for structurally repairing and aesthetically filling a plurality of slabs made of stone material and, for composites with a backing, providing the plurality of slabs with reinforcing nets or sheets adapted to further increase a tensile and flexural strength thereof, or for coupling said slabs to other slabs of stone material of a same type or a different type, or to slabs made of another material, all said slabs or sheets being dry assembled into a block, interposing layers of plastic separating sheets, said process comprising:

heating the stone slabs to be able to dry the stone slabs afterwards and completely under vacuum;

inserting said block composed of slabs, nets or sheets in an autoclave adapted to create a vacuum state to dry the slabs, nets or sheets at their core, and afterwards inserting, into a formwork in which the block is contained, resins at liquid state, in a necessary amount for completely impregnating the slabs, nets or sheets, said resins being inserted by pouring on a free upper surface of the block or inserted from a base of the block, a lower part and a perimeter of the block being contained into at least one of a liquid-tight and a gas-tight housing;

making said resin penetrate between the layers composing the block and into fractures and flaws of the stone slabs by atmospheric pressure, said atmospheric pressure operating as a piston on the fluid resin accumulated into a space formed above an upper face of the multi-layered block, the resin being thereby injected between the layers and into the flaws and fractures of the slabs;

inserting positive pressure into the autoclave;

applying a coating around said block, said coating being wrapped around said block under and along a vertical perimeter thereof, said coating being composed of liquid-tight and gas-tight component elements, one of said component elements being higher than the block and wrapped around said block having, its extreme edges mutually connected with a welding or other liquid-impermeable or gas-impermeable connection, said coating being further composed of a liquid-permeable spacer element to space the coating from the block, said coating being formed as a liquid-impermeable and gas-impermeable housing and to allow the resin to flow around and inside the block, elements composing said coating being mutually connected, to form an envelope, by an impermeable structural junction between the liquid-tight and gas-tight component elements;

containing hydrostatic pressures of the resin operating from inside to outside the block and controlling resin consumption through a formwork that gets a shape of the block contained therein, components of said formwork that are outside said coating not coming in contact with the impregnation resins, said coating being kept in position by panels and brackets that keep the panels against the block, said brackets being secured by a closing mechanism to a platform adapted to support and transport the block;

directly supporting through said blocks generated by pressure differentials occurring during rebalancing steps to the atmospheric pressure of a space inside the autoclave, or when inserting overpressures inside the autoclave;

when preparing said block, assembling said stone slabs into the block independently from their mutual thickness and distance between centers with other stone slabs placed at other levels of a composite block, said stone slabs being assembled together with other slabs made of different materials, every group of components of a composite slab being aimed to remain mutually strictly joined through separation by plastic separating sheets from every other equal or different group.

2. Process according to claim 1, further comprising preliminary washing said stone slabs before heating said stone slabs.

3. Process according to claim 1, wherein said stone slabs are at a sawing plane or are calibrated after sawing and are free from previously-applied nets, mats, or other reinforcements.

4. Process according to claim 1, wherein said panels form one continuous panel.

5. Process according to claim 1, wherein said panels are a plurality of mutually joined panels.

6. Process according to claim 2, wherein said preliminary washing is performed with a jet of water with a pressure higher than 100 atmospheres and said heating occurs at a temperature of 50–60° C.

7. Process according to claim 1, wherein said spacer element is shaped as plastic sheets that cannot be glued by the resin and are equipped with positive projections oriented towards the block.

8. Process according to claim 1, wherein said spacer element is composed of a woven or non-woven fabric that is permeable to resin flow.

9. Process according to claim 1, further comprising, in succession:

if necessary, cleaning and freeing from sawing powder residuals, washing with pressurized water, both faces of the slabs made of stone material, and heating said slabs at 50–60° C.;

placing a structural panel on a plane structure composed of a general bearing structure, with a bearing plane also formed by a plane part of at least two brackets housed inside said structure, said panel being placed along a starting assembling alignment line of the layers forming a block, said alignment line being backward placed with respect to the following positioning of said layers;

longitudinally placing on said panel a liquid-impermeable and gas-impermeable sheet, said sheet being placed at a same longitudinal alignment of the layers composing the block and being placed with an edge projecting from a following transverse head alignment of said layers, said edge being used to join said sheet at its opposite end, a length of said sheet being left a bit longer than what is provided for closing again inside said sheet, by wrapping said sheet, a whole perimeter of the block after that it has been assembled, said sheet being by at least 10 centimeters wider than said layers to be able to be extended from an opposite part to the longitudinal assembling alignment line;

placing above the sheet a further sheet that is permeable to a liquid substance, said further sheet being cut at a length that is equal or slightly less than a length of the slabs and at a width that is equal or slightly greater than a width of the layers of different materials, said further sheet being placed along the assembling alignment line of said layers and of the sheet and projecting from an opposite part for a width exceeding the width of said layers;

assembling in succession, said layers composed of stone slabs, reinforcement sheets or nets, the plastic separating sheet that cannot be glued and slabs or sheets made of other materials, said layers being all prepared in same dimensions in width and length and longitudinally and transversally aligned in a same way;

when the assembling of block has been completed with all programmed materials, placing on the upper face of said block and on blockheads the permeable sheets that complete the perimeter coating, said sheets being placed aligned like the different layers, but being prepared to be slightly projecting from an opposite part to the longitudinal starting alignment and, on the heads, that are equal or slightly shorter than a sum of thicknesses of the assembled layers, and prepared to be slightly projecting from the opposite part to the starting longitudinal alignment, said sheets configured to be replaced by a single sheet covering the upper face and the two heads of the block, said single sheet being prepared to be slightly projecting from the opposite part to the longitudinal starting alignment of the layers;

wrapping an impermeable sheet around a perimeter of the block and joining with a liquid-tight and gas-tight joint the two ends of said sheet;

placing the second longitudinal structural panel on the upper face of the block and compacting the layers of materials below, operating in areas that do not affect a following positioning of brackets;

placing and securing on a process platform a liquid-tight and gas-impermeable sheet, whose length is greater than the length of the layers of the different materials and whose width is similarly greater than the width of the different overlapped layers, to allow performing a welding between the vertical sheet and the horizontal sheet, and afterwards abutting onto said sheet a permeable sheet having sizes that are slightly reduced on a provided length and width of a thickness of the block after having compacted a pack of layers of different materials being overlapped as to form the block, and placing said sheet to be centered with respect to the wall of the block;

loading on a plane the process platform on an overturning trolley formed by two planes that are mutually arranged at 90°, said overturning trolley being equipped with a rotation pin that allows the planes to assume one or another position, accurately positioning said process platform on the plane of the overturning trolley prearranged to receive said process platform, and then stiffly securing said process platform to said plane by a securing mechanism;

rotating by 90° the trolley planes, if the process platform has been assembled horizontally on said trolley or placing and directly vertically securing said platform and then approaching the other plane composed of two forks to a general bearing structure inserting said forks for all their length into a housing provided therefore in said structure;

securing the panel by through-holes obtained in the process platform, by connecting with screws said platform to threaded holes prearranged on a base of the brackets housed in the general bearing structure;

afterwards securing the longitudinal panel arranged above the block to the platform with brackets, equipped with a slot arranged in a bearing foot at 90°, with screws passing into blind threaded holes obtained into the platform and that can be reached through said slot, said blind threaded holes being arranged on staggered rows and allowing to secure the brackets in varying positions and measures according to varying thickness of said block;

similarly securing the structural head panels to both heads of the block, a type of head panel being chosen to cover a maximum surface of the two heads, and placing the structural panels to then secure them by the brackets, using the suitable threaded holes and rows of holes in the process platform to lock with screws and said structural panels against the block, if it was chosen to close the heads in this process step;

rotating by 90° the block completed with its containment systems so that the layers of materials are vertically arranged;

if the heads have still not been closed, placing and securing the head panels;

connecting with a liquid-tight and gas-tight joint the impermeable sheet wrapping the perimeter and the base impermeable sheet, said connecting step being made possible by the fact that the longitudinal structural panels and the head structural panels are lifted with respect to the bearing plane of the process platform and by the fact that said panels have a thickness of some centimeters and leave a distance that is equal to their thickness between a rear plane part of the brackets and the block, allowing the passage of a drilled hole that dispenses an adhesive for the structural connection;

if necessary, to contain hydrostatic pressures, perimetrically support at the base of the block and on its four sides, the impermeable sheet, with stiff containment beams anchored to the process platform or to the brackets, and placed between said brackets and the perimeter of block until a space between the welding and a lower edge of the panels is covered;

lifting and laterally displacing the process platform in a way deemed most adequate to free the brackets from constraint of their transverse housing into the general bearing structure, thereby freeing the process platform and allowing to take the process platform back by a 90° rotation of the forks in the trolley to its plane position ready for a following cycle, and allowing said forks to be disengaged through a linear displacement of said trolley;

transporting the process platform and the block arranged over the process platform, completed with all its containment structures, into the autoclave and levelling with an air bubble an upper plane of the block;

closing access to the autoclave and scavenging air contained therein until a vacuum level is obtained that is as close as possible to zero, but not greater than 5 residual torr;

inserting into an autoclave the hardenable resin at liquid state with a pump or exploiting a depression inside the autoclave, and letting the resin drop on the upper face of the block or inserting the resin from below into said block with a pump, until a resin tank is formed with a computed amount that is enough for the block to be impregnated, contained by the perimetrical impermeable sheet that the structural bearing panels support, such resin configured to be freed by air in solution or emulsion before inserting the resin into the autoclave or, if poured from above, configured to temporarily stay into a vessel placed above the block into the autoclave and left there for a necessary time to free the resin from the air, to then control from an outside opening of the vessel or its slanting to make the resin fall down on the surface of the block, with the resin that starts seeping under, along the walls and between the layers of the block;

afterwards putting the autoclave in communication with the outside and forcing the resin to penetrate inside the block in all empty spaces that can be found under the liquid head, pushed by a pressure differential of about 1 Kg/cm$^2$;

inserting into the autoclave a positive pressure to force the resin, pushed by a further positive pressure that can be adjusted from 0.5 to 6 Kg/cm$^2$, to complete the process without leaving any internal area that is not reached by the resin and continuously and visually checking through a suitable porthole and with witnesses placed on the plane of the block, or with an automatic mechanism, that the upper level of the liquid head being descending does not let any part surface, thereby allowing the air to seep with consequent failure of the operation and manually or automatically taking care of restoring a safety level of the liquid head above the block;

leaving the autoclave under positive pressure for a necessary time to complete the impregnation operation, said time being variable according to a composition of the block and being longer when it is necessary to fill the spaces between two plane juxtaposed slabs in direct contact and afterwards taking back the autoclave to atmospheric pressure;

letting harden or hardening the resin in the autoclave or outside the autoclave;

freeing the block from the brackets and the structural panels and then cutting with a blade the impermeable sheet and the permeable sheet, completely freeing the perimeter of the block if the selected spacer element is formed of plastic sheets that cannot be glued;

rotating the block by 90°, freeing the block also from the remaining base impermeable sheet and from the permeable sheet base, taking the block onto a machine with diamond wire or blade and cutting on an outside of the block about one centimeter for every face, normally to the layers, freeing the various composite panels, made independent by said cuttings on the perimeter because they are separated by the plastic sheet since the beginning;

sending the composite panels to surface finish operations and to following workings.

10. Process according to claim 9, wherein the upturning operations of the block are performed on a fixed upturning device next to which the block is moved and on which the block is then loaded for upturning and following handlings and workings.

11. Process according to claim 1, further comprising, in succession, before inserting the block into an autoclave to be impregnated:

if necessary, completely washing with high-pressure water the slabs of stone material, and heating said slabs at 50–60° C.;

placing, on a process platform abutted on a plane and equipped with rows of threaded holes arranged on four sides of said platform towards a center to be adapted to different plan sizes of the stone slabs and the other slabs and layers, having available at least two rows of threaded holes on longitudinal sides and at least two on transverse sides, a base impermeable sheet, and, above it, a permeable sheet that, if composed of one sheet with projections, will have such projections arranged upwards, the sheets being centered with respect to the following assembly of slabs and layers, the basic sheet having increased sizes in length and width to afterwards allow structural welding to the sheet, the sheet having sizes that are equal to or slightly less than slabs and layers;

horizontally assembling in succession, said layers composed of stone slabs, reinforcement sheet or nets, plastic separating sheet that cannot be glued, and slabs or sheets made of other materials, said layers being all prepared of same sizes in width and length and being longitudinally and transversally aligned in a same way;

when assembling of the block has been completed with all the programmed layers, placing on vertical walls of said block a single perimetrical sheet of permeable material, or placing on said vertical walls four sheets of said permeable material, having measures in length that are shorter than the one for the walls that they are aimed to cover and measures in width that are equal or slightly greater than the height of the walls themselves, taking care, if said permeable sheet has projections, that the projections are oriented towards the block;

afterwards wrapping the impermeable sheet around the perimeter of the block and joining with a liquid-tight and gas-tight joint the two ends of said sheet, said sheet having a width that is greater than the height of the block, to form a containing basin for the resins over the upper face of the block;

approaching in contact with two longitudinal vertical walls of the block the structural panels, whose width is greater than a maximum height of the block that can be processed to allow containing the resins, taking care that their lower edge is lifted by some centimeters from the bearing plane of the process platform, using temporary shims, and then stiffly securing said panels against said block by brackets equipped with slots in their bearing base to the process platform to which said brackets are secured with screws into threaded holes that can be reached through the slot;

performing the same operations to secure the structural head panels, that have the same width as of the longitudinal panels, corresponding to the highest block that can be processed, taking care of choosing a most suitable type of panel, as length, for covering a maximum possible distance between vertical walls placed against a long side of the assembled block, to avoid leaving areas of said impermeable sheet that are subjected to resist, without said sheet being supported by the head panels, to hydrostatic pressures generated by the resin that will be inserted into the block;

joining with a liquid-tight or gas-tight joint a whole vertical perimeter of the impermeable sheet, that has been previously welded on itself at its extreme edges and the sheet arranged at the block base, mutually joining them, with an operation that is helped by the thickness of the panels that defines an equal operating horizontal distance with respect to the block and the related distance with respect to the bearing base on the platform of said longitudinal panels and the head panels that guarantees a vertical operating space, with a structural welding process, to close the impermeable envelope that is wrapped around the block on five faces, leaving it open on its top;

if necessary, to contain the hydrostatic pressures, perimetrically supporting at the base of the block and on its four sides, the impermeable sheet, with stiff containment beams anchored to the process platform or to the brackets, and placed between said brackets and the perimeter of block to cover the space between the welding and the lower edge of the panels.

12. Process according to claim 1, or with all assembling and following impregnating steps of said layers performed in a formwork composed of a bottom and four structural metallic rigid walls in which the liquid-tightness and gas-tightness is guaranteed by the structures themselves and by sealing gaskets arranged in mutually-screwed connection areas of said rigid metallic structures, said structures also performing a function of containing hydrostatic thrusts of the resin towards the outside and thrusts generated by pressure differentials that occur in rebalancing steps at the atmospheric pressure or the steps of inserting overpressures inside the autoclave, between the outside of the block closed by said four walls, the bottom, and the upper-placed fluid resin head, wherein consumption of impregnation resins is limited by a structure that is placed above the block after having ended its assembling, such structure being composed of a material whose specific weight is greater than a specific weight of the resin and globally heavy enough to win the hydrostatic resin thrust and being built with a sufficient thickness so that the resin cannot cover it on the top, said structure being built of a material to which the resin cannot stick on or being coated with a paint or another protection to which the resin cannot stick on, the structure as a whole being formed by a central square or rectangular part, said central part configured to be accurately lifted and transported onto the block through connections, to cover a majority of an upper face of the block, said structure being composed such that its lower face in contact with the block is equipped with projections in contact with the upper face of said block, such projections configured to allow a passing channeling for the resin with a reduced height, said structure forcing the inserted resin to be arranged in thickness equal to many centimeters in a perimeter corridor defined by its plan encumbrance and by a perimeter inside the impermeable sheet that is contained and supported by the structural containment panels, said structure being also equipped with a central through-hole and equipped with reference notches for a resin level, said reference notches allowing to visually evaluate said level, through an inspection porthole, and allowing to provide, with a command or a manual action, inserting further resin to avoid that an area of the upper face of the block is uncovered, making air penetrate inside the block and making the impregnation process fail.

13. Process according to claim 12, wherein the resin level check is automatically performed, and consequently pumping of resin is automatically controlled when the level drops below a safety level, such level being checked through a floater, said floater being placed into a central hole, or, to avoid turbulence disturbances, being placed through a second dedicated hole, communicating, next to the upper face of the block, with the main center distance hole.

14. Process according to claim 1, wherein the block is assembled with layers whose width and length are different from width and length of other layers, each layer or homogeneous group of said layers having a different size in width and/or length, with a same starting assembling reference in the block at an angle of 90°, each layer or homogeneous group of said layers compensating at the other one or two ends for a resulting missing thickness through shims, so that the block, at the end of its assembling, is a complete parallelepiped, with its six faces free from areas in which filling material is missing.

* * * * *